(12) United States Patent
Gamble

(10) Patent No.: US 12,445,513 B2
(45) Date of Patent: Oct. 14, 2025

(54) METHOD AND SYSTEM FOR CONTROLLING FUTURE BEHAVIOR OF DEVICES

(71) Applicant: Oliver Wendel Gamble, New York, NY (US)

(72) Inventor: Oliver Wendel Gamble, New York, NY (US)

(*) Notice: Subject to any disclaimer, the term of this patent is extended or adjusted under 35 U.S.C. 154(b) by 0 days.

(21) Appl. No.: 16/168,792

(22) Filed: Oct. 23, 2018

(65) Prior Publication Data

US 2019/0141111 A1    May 9, 2019

Related U.S. Application Data

(63) Continuation of application No. 12/658,000, filed on Feb. 1, 2010, now Pat. No. 10,313,530.

(51) Int. Cl.
| H04L 67/025 | (2022.01) |
| H04L 67/02 | (2022.01) |
| H04L 67/06 | (2022.01) |
| H04L 67/133 | (2022.01) |
| H04L 67/52 | (2022.01) |
| H04N 21/442 | (2011.01) |

(52) U.S. Cl.
CPC .......... *H04L 67/025* (2013.01); *H04L 67/133* (2022.05); *H04N 21/44209* (2013.01); *H04N 21/44224* (2020.08); *H04L 67/02* (2013.01); *H04L 67/06* (2013.01); *H04L 67/52* (2022.05)

(58) Field of Classification Search
CPC ......... H04L 67/02; H04L 67/06; H04L 67/18; H04L 67/025; H04L 67/40; H04N 21/44209; H04N 21/44222
USPC .......................................... 379/101.01–102.3
See application file for complete search history.

(56) References Cited

U.S. PATENT DOCUMENTS

| 6,816,703 | B1 * | 11/2004 | Wood | G06Q 30/02 |
| | | | | 455/3.04 |
| 7,660,401 | B2 * | 2/2010 | Gamble | H04L 12/2818 |
| | | | | 379/102.03 |
| 8,754,992 | B1 * | 6/2014 | Schulze | H04N 21/42226 |
| | | | | 725/132 |
| 10,313,530 | B2 * | 6/2019 | Gamble | H04M 11/007 |
| 2002/0147782 | A1 * | 10/2002 | Dimitrova | H04N 21/4394 |
| | | | | 709/207 |
| 2006/0067581 | A1 * | 3/2006 | Hasegawa | H04N 21/234318 |
| | | | | 375/E7.076 |

(Continued)

*Primary Examiner* — Hemant S Patel
(74) *Attorney, Agent, or Firm* — Dunnington Bartholow & Miller LLP

(57) ABSTRACT

A distributive instructions transmission system for the performing a task the can be generated by request of a user. A user initiates the task by transmitting instructions for a chosen task to a remote processing center. The selected task will be acted upon by one or several processors. The processing center immediately generate instructions that will execute the task, check to see if the task is already requested by other users, or take steps to make possible execution of the task. Execution of the requested task can involve the generation of an enhance subset of user instructions that is transmitted to one or many different processors. If more than one processor is involved they can be located in a single site or be remote to one another. The instructions for each sub-segment task can be routed to the involved processor(s), and they initiate an integrated coordinated action.

11 Claims, 14 Drawing Sheets

(56) References Cited

U.S. PATENT DOCUMENTS

2009/0119701 A1* 5/2009 Aldrey ................ H04N 21/435
                                                    725/32
2009/0288112 A1* 11/2009 Kandekar .......... H04N 21/4532
                                                    725/32

* cited by examiner

Figure 6A

A large media file composed of many frames of images and audio is divided into four files labeled "A","B","C", and "D".

AAAAAAAAAAAAAAAAAAAAABBBBBBBBBBBBBBBBBBBBBBBBBBBBBBCCCCCCCCCC
DDDDDDDDDDD

Step 6.01 ↓

AAAAAAAAAAAAAAAAAAAAA

BBBBBBBBBBBBBBBBBBBBBBBBBBBBBB

CCCCCCCCCC

DDDDDDDDDDD

Step 6.02 ↓

Flash Schedule

| Media Supplier |
|---|
| Channel |
| 101.1 AAAAAAAAAAAAAAAAAAAAA   CCCCCCCCCC |
| 101.3 BBBBBBBBBBBBBBBBBBBBBBBBBBBBBB    DDDDDDDDDDD |
| 1:00  1:05  1:10  1:15  1:20  1:25  1:30  1:35  1:40  1:45  1:50  1:55  2:00 |
| Time -------> |

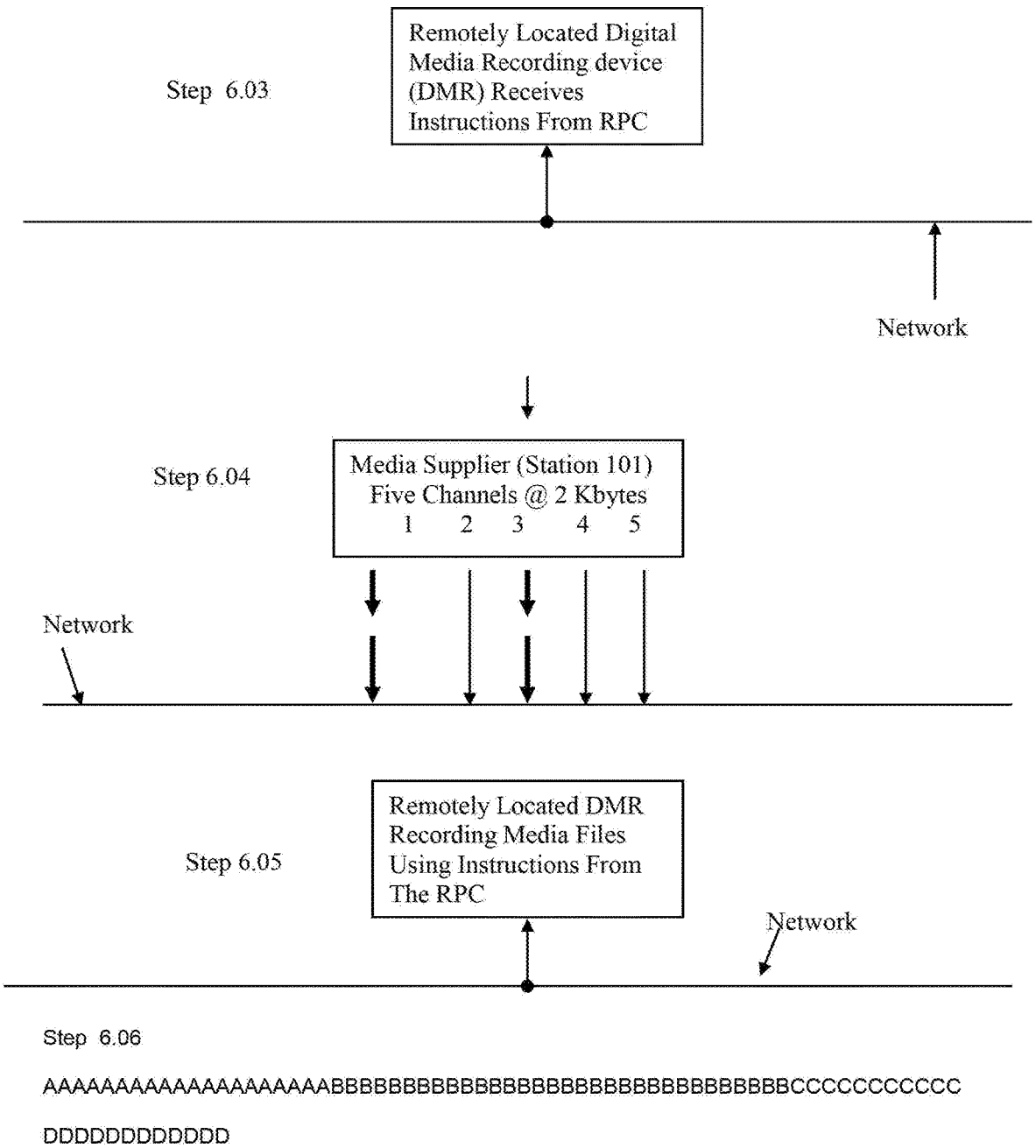

Flash Schedule

| Media Supplier |
|---|
| Channel |
| 101.1 AAAAAAAAAAAAAAAAAAAA  CCCCCCCCCC |
| 103.3 BBBBBBBBBBBBBBBBBBBBBBBBBBBB     DDDDDDDDDDD |
| 1:00 1:05 1:10 1:15 1:20 1:25 1:30 1:35 1:40 1:45 1:50 1:55 2:00 |
| Time ------> |

METHOD AND SYSTEM FOR CONTROLLING FUTURE BEHAVIOR OF DEVICES

This application is a Continuation in Part of U.S. patent application Ser. No. 12/658,000, and U.S. Pat. No. 7,194,072 are herein incorporated by reference in its entirety and is a basis for priority.

FIELD OF THE INVENTION

The Invention generally relates to forwarding instructions to a media recorder connected to a global communication network and, more particularly, to a media recorder being programmable to manipulate the contents of files downloaded/recorded on to the media recorder's storage, simultaneously record several files that can be assembled into a single file. The invention also includes a method for providing a more efficient transmission of requested videos from media providers, greater accountability of downloads, greater consumer-advertiser interaction in media availability, and more efficient use of bandwidth.

DESCRIPTION & BACKGROUND ART

Advances technology in digital signal processing has led to high speed transmission of digital media content to the consumer via telephone, satellite, and coaxial cable networks. Theses advances enable media suppliers to provide hundreds of cable television channels to subscribers by packaging digitally store video (digital video), transmitting the compressed digital video over conventional coaxial cable television channels, and then presenting the video to the subscriber via a set top box (tuner and digital media recorder). The one of the fastest going component of this technology is video-on-demand. A system in which a subscriber communicates directly with a video service provider via a communication system (phone/cable/satellite) to request a video title from a video library; the requested video title is routed to the subscriber's home via a communication system for immediate or delayed viewing.

The viewer's selected media title is downloaded from the provider's archive and broadcasted over a word wide communication network to the viewer's sit on top box. In General, the system works by allowing the viewer to scroll through the lists of programs, selecting a program and forwarding that selection to the service provider such as disclosed in U.S. Pat. No. 5,357,276 issued Oct. 18, 1994 and U.S. Pat. No. 5,477,262 issued Dec. 19, 1995. Each request is answered with a single download to a requesting customer. Alternatively, large group downloads require the scheduling of downloadable/broadcast media programming several days to weeks in advance. There is no quick and easy way to provide small disperse group consumers true VOD without large bandwidth or long wait time.

A derivative of the Resource Interchange File Format (RIFF), is AVI (Audio Video Interleafs). Which divides a file's data into blocks, or "chunks." Each "chunk" is identified by a Four CC tag. The composition of an AVI file takes the form of a single chunk in a RIFF formatted file, which is subdivided into two mandatory "chunks" and one optional "chunk".

The first sub-chunk has an identifying tag that is called "hdrl". Hdrl is the file header and contains metadata about the video, such as its frame rate, height and width. The second sub-chunk has an identifying tag that is called "move" tag. This chunk contains the audio/visual data that make up the AVI movie. The third optional sub-chunk is identifying tag called "idxl". This tag indexes the offsets of the data chunks within the file.

Using the RIFF format, the audio/visual data contained in the "movi" chunk can be encoded or decoded by software called a codec: an abbreviation for (en)coder/decoder. The codec of a file is utilized for translates between raw data and the (compressed) data format used inside the movi chunk. An AVI file is very versatile, it can carry audio/visual data inside the chunks in virtually any compression scheme, including Full Frame (Uncompressed), Cinepak, Motion JPEG, Editable MPEG, MPEG-4 Video, VDOWave, ClearVideo/RealVideo, QPEG, and Intel Real Time (Indeo).

Media file are normally viewed at a rate of 30 frames per second. The transmission of large media file is facilitated by subdividing the large file into several smaller files that can be easily transmitted over a network and re-assemble at a destination. The smaller the file size, the easier it is for a network to manage the transmission the file without experiencing difficulties. Flow control, ease at which files move over a network, is affected by the size of a file. The bigger the file, more time and resources of the network over which it is being transmitted must be invested in the file's transmission. The bigger the file, the more buffer space must be used to store the contents (data) contained within file within the network as it is being transmitted.

The size of a media file has increase in size as the visual destiny (resolution) of media displaying device increase. We when from Standard-Definition TV, to Enhanced-Definition TV, and now we have High-Definition TV. The frame rate of a media file may remain the same (30 frames per seconds), but the size of each frame has increased several folds. A two-hour HD movie can easily more than 2 times the size of a two-hour Standard-Definition TV movie file. This increase content means that we will need to move more bigger media file faster, if we are to fully utilize the newly available High Definition viewing.

Data Stream on a cable network has multiple channels that simultaneously carry multiple media programs. The channels are can be generated by employment of Time Divided Multiplexing (TDM) technology. A consumer can selectively pick out a program by tuning to/selecting a specific channel on the cable network; pulling out a desired media program from the stream of multiple programs being transmitted. Multiplexing can also be Frequency Divided (FDM). Both techniques will allow for subdividing of bandwidth into channels that can be used to carry multiple downloads from a single source point on a network.

The Data Stream on a cable network can be composed of media from several different media sources that share the cable networks abilities to transmit, download media, to consumers. In an equal usage of a communication network resources, each supplier/channel will have equal access to the network's resources (ability to download media to customers). It should to noted that, equal access to communication network is desirable, but not necessary for patent to work.

In a multi-user network environment, all users should be allocated the same amount of network resources. If the network has R amount of resources and N number of users, then an equitable distribution would be R/N. In a closed network system, finite resources, each user would be allocated equal amount of data transmission opportunity: if fair or best effort. A media supplier is a company that provides downloadable media that can be viewed over a network (i.e. Satellite, Cable, Telephone, Broadcast Radio Waves). Each Media Suppliers (MS) that subdivide its 10 Kbytes per cycle into 10 sub-channels will be able to simultaneously transmit up to ten (10) media program.

Each second will constitute a cycle in the fair use of the network resources (ability to transmit/download media to customers). If a network has the ability to transmit 60 Kilobyte of data per second (60 Kbytes/sec bandwidth) and there are six (6) MS supplying media programming. Then a fair use of the network would be 10 Kbytes/seconds per user (60 Kbytes/6 per seconds), or 10 Kbytes per seconds. Each MS supplier can divide their available bandwidth (10 Kbytes/seconds into as many units as needed to provide access to the various channels the service. If the MS service ten channels, then they could be able to divide their (10 kBytes/second) available bandwidth equally between their channels giving each one of the channels 1 Kbytes each.

When a MS transmits a media file, the size of the file will determine how much of the networks resources it will consume. If one the MS transmit a file bigger than the fair use allotment (i.e. 11 Kbytes), then one of the other MS suppliers will not be able transmit the files that they were planning to transmit. Trying to transmit more data (content) than the network can handle, is similar to pouring 61 ounces into a container that hold 60 ounces. The attempt will excess the networks capacity and result in the loss of data that is being transmitted/downloaded on the network. Over usage will result in congestions, and congestion will lead to loss of data, and a need to re-transmit lost data will lead to more congestion that can lead to more data loss or slowing of the data transmission process. A network tries to compensate for data lost by re-transmitting the original content, but this adds to the load on the network, and further delay the transmission-reception of the data (content) to the consumer. If the distribution of resources is not equally allotted amongst the MS, then transmission is according to available bandwidth given to each Media Supplier. The Media Suppliers with less access bandwidth will have to adjust what they are transmitting to match what is available to them. Having the ability to transmit large files divided into smaller component will increase what they can deliver.

One method for facilitating the transmission of a Large Media File is to sub-divide the file into several smaller files that can be easily transmitted over a network and re-assemble at a destination. The smaller the file size, the easier it is to fit the file into a transmission channel and not exceed the fair use allotment of the MS provider.

In FIG. 1, a network that divide the capacity/resources of the network fairly among the user of the network. If a six-user network has a capacity to transmit 60 Kilobyte per seconds, each user (Media Supplier) will have 10 Kilobyte per second transmitting capacity.

In FIG. 2 each arrow represents a down of data on to a network. The data can be one large file that takes up the entire bandwidth allotted in the current queue/cycle (FIG. 2b), or it can be sequential download of several (5) small files that together use the available bandwidth allotted in the current cycle (FIG. 2a). Each of the smaller files will utilize a portion of the user allotted bandwidth. If the use has 10 Kbytes bandwidth on the network, then the total bandwidth available to the Media Supplier would by 10 Kbytes for 1 large (Mega) file or 10 Kbytes divided among 5 sub files (2 Kbytes each). if a media supplier is transmitting files on a multi-user network, employing Time Divided Multiplexing (TDM) technology, small files will inherently provide greater stability to the network. Smaller files will be easier to transmit on a multi-user network without the worry of exceeding the bandwidth allotment of the queue; several 2 Kbytes files will easily fit into a 10 Kbytes queue.

In FIG. 3 a large file (File Mega) is subdivided into several small files and is transmitted over a network. The component files are transmitted in the traditional sequential methodology on a network that uses TDM methodology. A multi-channel Medial Supplier will be able to sequentially transmit the subdivided file on one channel (Station 102, channel 1 or Station 102, channel 4).

SUMMARY OF INVENTION

It is the object of this invention to provide a new and improved media download system. In which a multiplex enabled Digital Media Recorder (DMR) containing an operating system that can be controlled by instruction inputted from a remote source via a communication network. This invention solves the above described problems and other associated with media downloading over a limited resource network. The licensing body that is providing the media will be able to provide faster media download, improved revenue tracking, and a custom viewing experience.

A consumer having an account with a service that provides a library of downloadable (broadcast) media via a network will be able to experience improved media on demand (Video on Demand: VOD). The media title selected from the provider's library, the date and time at which the media is wanted for viewing, and the customer setting are all collected and forwarded for processing. The information is forwarded to a Request Processing Center (RPC), that will determine how the requested title will be delivered, and from what source library/libraries. A DMR connected to a communication network will be able to receive instructions from the RPC, and to capture media downloaded from a library over a network. The instructions inputted from an external source will modify the behavior of the DMR, instructing it when, where and how to record media that is being downloaded (broadcasted) from a media provider library. The instructions will determine when the digital media recorder will start and stop recording media on the network; and what channel the DMR will use to when it is recording. The instructions inputted from an external source will be coordinated with data downloaded (broadcasted/transmitted) over a network. The network over which the instructions and the media that is to be recorded can be the same network, or instructions can be transmitted to the DMR over a network different from the one the media is transmitted over.

Using present technology, it is possible to sub-divide a large media file into small media files for the purposed of transmitting over a network. At a destination the transmitted media files are assembled in a manner that will allow the receiver of the media files to view the original media file contents. Time Divided Multiplexing (TDM) technology can be utilized to simultaneously deliver multiple media files to a consumer. The consumer using selective tuner/filters can record for media from two distinct channels at the same time.

Part of the coded instructions from the RPC to the DMR can contain customization instructions. Instructions that tells the DMR not only how to assemble several files into one large files, but code for telling the DMR to skip over sections of the assembled file when the contents of the file are displayed. This will allow users to let their children to view media (i.e. "R" rated movies). The advantage of this is that the movie will now have a wider potential audience, increasing the potential revenue that can be earned, and still retain the true contents of the media/movie creator. Enabling the original target audience to see the movie they want. Since the instructions are targeted to a specific device (DMR), if there are two DMRs in the house the same movie can be view in its original form on one of the DMR (parents' room) and in a different form by the parents with their children (family room DMR).

When a consumer wants to record a downloadable media file (i.e. Movie), the consumer will make known (identify) the media that they want to a view. The identification will be made to a Request Processing Center (RPC). The RPC will generate a download schedule for the requested media that will involve the simultaneous transmission of media files that are subdivided segments of the requested media (Movie). The RPC will also generate code that will instruct the consumer's digital media recording device to simultaneously record media files from two distinct channels.

The technology used to capture media simultaneously from two distinct sources can be exploited to increase download speed of media on a network and reduce the amount of congestion resulting from the transmission of large files.

PREFERRED EMBODIMENT

In a preferred embodiment, the invention comprises (a) any one of a plurality of remote information input terminals that can establish a temporary connection to a centrally located computer; (b) a central computer configured to accept, process, and store all information collected from a plurality of remote input terminals before forwarding instructions to a targeted device; (c) a central computer remote to both the targeted electrical device and the plurality of input terminal configured for determining whether information collected from any given remote input terminal contains a valid authorizing password; (d) a central computer remote to both the targeted electrical device and the input terminal configured for determining whether information collected from any remote input terminal contains instructions for controlling a targeted electrical device located at a remote location; (e) a central computer configured for processing and storing for future use information collected from any one of a plurality of remote input terminals; (f) a central computer configured to transmit instructions derived from processing information from a plurality of input terminals to a receiving device at a targeted remote location; and (g) a receiving device able to convey received instructions to a target electrical device at a location remote to both the plurality of input terminals and the central computer; the instructions from the central computer able to affect the future behavior of the targeted electrical device in accordance with the information entered at the remote input terminal.

In FIG. 4, the Media Supplier (MS) will have a media Request Processing Center (RPC) that will process all incoming request for downloading of select media (video) in its catalog (FIG. 4, Step 6). The Media Supplier catalog will be accessible to both the public and registered consumers via a communication network. A communication network (global in nature) is any network over which information or data can be transmitted from one location to another location (examples: telephone, cellular, cable, satellite, or any combination of the above). The communication system can be cable, wired, Wi-Fi, satellite, Internet, or a combination of the abovementioned forms of communication. Information from the input terminal may contain instructions, a valid user id, identity of the targeted appliance, and location of the appliance. The remote input terminal may be an Internet access terminal with user interfacing, with the user interfacing linked to a website on a central computer. Each title in the MS catalog will consist of collection of Subdivided Media Files (SMF). The MS will convert one large (2 Gigabyte) media file divided into 100 (twenty-megabyte) smaller media files, making it easier to convey a media tile to consumer(s). The reduced size will also make it easier to and manipulate the media title according to individual consumer viewing profile of a register consumer. The SMF generated from division of a large media file into many smaller media files does not have to be uniform, the generated files can be of varying size. Each of the resulting SMF can be of a different size and require a different amount of time to be transmitted over the communication network (FIG. 5). Each of the SMF generated from a large media file can be transmitted independently by the MS to consumers over a communications network.

The SMF generated from a large media file does not have to be uniform in size, each of the SMF can be different in size from one another. The difference in file size will result in a difference in the length of time it will take to transmit a file. The time required to download/broadcast each of the individual SMF is stored at the MS. Enabling the MS to know how long it would take to download/broadcast a given media title as SMF to a customer. The number of SMF that a given large media file (title) is divided into can vary from title to title.

A consumer registered with a RPC/MS can request a media titles, to be registered consumer will have provided the RPC/MS with information about their DMR (how many they have), how they want to be billed, and optional viewing profile for files on a given DMR. The RPC/MS would have provided the consumer with a unique combination of User Name and ID Code (Password). The DMR information will be used by the RPC to deliver instructions to the DMR, instructions that will be used by the DMR to capture any media file the consumer has selected from the RPC/MS catalog. The billing information will be used for collecting funds from the consumers for media titles provided to the consumer. The optional viewing profile will contain any restrictions that the customer wants to include, such as types of media that is acceptable: i.e. (G)eneral, (P)arental Guidance, (R)estricted Viewing, (A)dult. The consumer will use their User Name and ID Code when placing a request. The profile may also include current interest of the consumer collected in the form of answers to pop quiz. The consumer self-rating can be used to determine how a given media title (video) is displayed on a DMR.

A consumer using an input terminal will be able to communicate with a Request Processing Center (RPC), and indicate which video they want to view, and when they want to view the video (FIG. 4, Step 2 & Step 3). An input terminal can be any device that can be used to communicate with the RPC over a communication network (i.e. cell phone, line phone, computer terminal, fax, set on top box, or a combination of the above). The RPC will process all incoming request for downloads of videos in the Media Supplier's catalog (FIG. 4, Step 4). The RPC will process the request and based on availability of the requested title, popularity of the title, and available bandwidth for downloading a schedule will be created. The information contained in the schedule will be used to generate instructions that will be forwarded to the consumers Digital Medial Recorder (DMR). The instructions will enable the DMR in the consumer profile to record the desired program at an accelerated rate.

Customer using a remote can contact a RPC to generate instruction code that will control the future behavior of a targeted device. In one embodiment the targeted device can be a digital media recorder (DMR) located remote to both the sender user and the targeted device. The instruction code can be to modify the display of a downloaded or streaming media file. The modifications can be to remove a certain number of frames from the viewing sequence of the media file: reducing the amount of time it takes to view the file. The modification can be to omit/skip over entire selection of frames relating to a specific activity depicted in the downloaded or streaming media file. This will enable user to request a media file that is mending to be viewed by an adult due to nudity, violence, situation, language, or other subject matter. This will enable users to select what movies their children can see, and not worry about them seeing/being expose to subject matter not suitable according to their opinion.

The Request Processing Center will forward information on all requested media downloads to a Media Supplier (MS). The information forwarded to the MS will contain the title, the time and date the consumers want to view the media, and the number of consumers requesting the download. When a request from a RPC for a specific media title reaches the MS, the MS will respond with listing of the available SMF of that title, a listing of available bandwidth that can be used to downloading the SMF of that title, and the duration it will take to download each of the individual components SMF. The RPC will use this response information to determine how to schedule the download of the requested media title (FIG. 6).

In the preferred embodiment FIG. 6, a request to the RPC results in the creation of a Flash Schedule for the download of the requested video. The Flash Schedule is an internal schedule created by the RPC for downloading a specific video. The Flash Schedule is based upon information received from the MS regarding the download/broadcast of a specific media title: available amount of bandwidth, time by which the requested video is expected to be available to consumer, amount of time required to transmit each of the media file (media files: SMF), and the number of consumers requesting the video. The following element go into creating a flash schedule: if ten consumers want to see the video on Thursday, the earliest request is for viewing the video by 8:00 pm (the other nine want to see it later in the day), the requested video takes two hours to download under available bandwidth, then the flash schedule will have instructions that will tell the DMR device of the requesting ten consumers to start recording at 6:00 pm on Thursday. This way all of the requesting consumers will have the video available by the time that they requested.

The RPC will use the Flash Schedule to generate instructions that will enable the consumers DMR to simultaneously record video files that are being downloading on two or more channels. This will reduce the amount of time it will take for transmitting content over a network, that allowing for optimum use of a network transmission (download) capacity. The consumer need only indicate the program, the RPC will do all of the scheduling in the background, by reviewing available download capacity of the network being used by the MS, and the Flash Schedule.

Typically, the MS will have a catalog of digitally stored videos that are ready for download to any given customer. These videos can be preprocess for optimum download, by being divided into many smaller files that are easier transmitted over a multi-user network (FIG. 6, Step 601). A large video file can be subdivided into component files that vary in size, from one frame per file, 30 frames per file (1 second of video viewing), 1,800 frame per file (1 minute of video viewing) and/or larger lengths of viewing time segment per file. The subdivided files are assigned to available channels of the MS, based on time restrains of the Flash Schedule FIG. 6, Step 6.02. The RPC will generate instructions that will tell the DMR of the customer how to capture the video file that is about to be transmitted over the network (FIG. 6, Step 6.03). The MS will transmit the requested video on the channel indicated in the Flash Schedule (FIG. 6, Step 604), and the consumer's DMR will record the files transmitted by the MS based upon the time and channel information contained in the instructions supplied by the RPC (FIG. 6, Step 6.05). The consumer's DMR will reconstruct the transmitted file for the consumer to view (FIG. 6, Step 6.06).

The subdivided files (SMF) can be coded to indicate both the position in the original large file, and their nature (type of content contained in the media). The position coding will be used by the software on the DMR to reassemble the downloaded video. The file content code can be use as behavior indicator that will cause the DMR to fast forward through a segment of the video. This behavior modality (fast forwarding a scene) will enable a consumer to view the video at a preferred rating (General, Parental, or Adult). Specific scene in a video can be skipped over without un-authorized editing. The code position code and granularity of the subdivided file can be used to allow the customer to indicate how long they want the video to be. The position code of a file can be used by the software on a DMR to selectively skip (Not show or fast forward) over part of the down loaded video. If the software were to skip over frames 1, 15 and 25 of every 30 frames per second video that is 1-hour in time length (duration), the duration would be reduced by 10% (1 hour is reduced to 54 minutes duration). This will be possible with digital videos that are stored/transmitted as files that can be subdivided into a set number of frames per second (i.e. 1/30 of a second). Optimum time editing of will be obtained by with a large video file that is subdivided into very small (one second duration) video files. The information contained in the header (hdrl) can be used to store information on the nature of the video contained in the file (adult, violent, et cetera) along with duration. This information will enable consumer driven editing of video at the site of the video viewing, if the DMR has the ability to utilize this information.

Alternative Embodiment

In an alternative embodiment, a Request Processing Center can work with several geographically distinct Media Suppliers (FIG. 7). The RPC will forward to the MS, the consumer requested title and determined delivery time (when consumer(s) want to have the media available for viewing. The various MS will forward information on available bandwidth, SMF data (number of component files and their individual download/broadcast time requirement). The RPC will create a Flash schedule using the information received from the various MS. The information will be used to craft a schedule for the download/broadcast of the requested title. The RPC generated schedule will instruction the MS in what files they are to transmit, when they are to transmit the files and which channel that are to use in the transmitting of specific components of SMF title in their catalog. RPC will also generate instructions that based on the schedule forwarded to the MS, instructions that will enable the requesting consumer's DMR to capture requested title. The instructions will contain the coding for the DMR to simultaneously record two (2) or more SMF, and any require instructions for re-assembly and viewing by the consumer.

In a multi-MS system, one of the MS can be the holder of a critical file, a file that is significant to the entire context of the media that is to be viewed by the consumer. This MS can act as a central clearing house that tracks the royalty billing for supplier of the media. This would reduce the reliance on reporting from individual MS, and allow for the more wide spread distribution of media to various MS. This aspect would allow for greater transparency in the VOD/Rental market, studios would be able to directly participate in the download process if they operate the MS with the context sensitive files.

In FIG. 4, there is a user (Step 1) contacting a Request Processing Center (RPC) within a Media Supplier (MS) facility (Step 3) via a communication network (Step 2). The RPC will accept inputted instructions transmitted over a communication network from the user. The RPC will process and store the data at the MS (FIG. 4, Step 4). The RPC will then forward the process input from the user to a remote location (FIG. 4, step 5, step 6, & step 7) over a communication network. At the Remote location the Digital Media Recorder (DMR) will accept and evaluate the information from the RPC. If incoming instructions are deemed valid the DMR will accept and process the Instructions from the RPC (MS). DMR can be a sit on top box, a component external and independent, or circuitry inside of an appliance that is capable of displaying the requested media (video, text, et cetera). If the receiver of the instructions is external to the DMR, then the external reception device will be able to transmit the instructions to the DMR microprocessor using Infrared, Radio Frequency, Blue Tooth, Ultra Violet, Sound, Wired technology, or a combination of the fore mention technologies (FIG. 4, step 8). Using instructions from the RPC, one or more MS will transmit the requested media as SMF.

In FIG. 5 a Large Media (Video) file is subdivided into many smaller sub files (SMF) that can more easily be transmitted over a communication network to consumers. Once the SMF reach the consumer' Digital Media Recorder (DMR), the DMR can store and re-assembled SMF back into a simulated large media file, only now there will be tags that can be read by the consumers DMR that will indicate the viewing palate: General, Restricted, Adult, et cetera). Using the consumers indicated preference, the consumer's DMR will display the media according to their viewing profile.

In an alternative embodiment FIG. 6 and FIG. 8, Multiple MS can work together to supply a consumer with a single video. This arrangement will give the MS several advantage such as pooling cost of providing a video, reducing the amount of time required to service a given customer or group of customers, revenue sharing, and open new revenue streams (Lightning Program Scheduling—LPS). In this embodiment the Request Processing Center (RPC) can be independent of the Media Suppliers FIG. 7.

In FIG. 6, multiple Consumers with an account with a RPC will communicate their desired for a specific media (video) download from a listing of media titles from the Media Suppliers (MSs). The RPC will process the request by generating a Request Chart and forwarding it to the MS it has a relationship with. The RPC Request Chart will be prioritized listing of media requested by consumers, with the most requested title being placed at the top and the least requested at the bottom. In addition to the number of consumers wanting to view a specific title, the chart will also contain, the desired date and time of each consumer desire have the material available for viewing. Media Supplier(s) will respond to the Request Chart with information that the RPC will take into consideration when generating a Flash Schedule: available bandwidth for download, available channels, any other factor that may be significant to the process. If advertisers are willing, to place adds by viewing subject matter, then consideration can also be given to what advertisers are willing to pay to have their ads aired during a specific type of show. All factors are taken into consideration by the RPC, and a Flash Schedule is generated for the various MS. The MSs will acknowledge the Flash Schedule, indicating their agreement. The RPC will then generate and transmit instruction to the requesting consumers Digital Media Recorder (DMR) via a communication network such as phone, satellite, cable, cellular, or a combination of. The instructions from the RPC will contain information on what channel(s) the DMR is to record from, and the start and stop times for the recording(s). The DMR will capture the downloaded media files and assemble for viewing by the consumer (FIG. 5 Step 5.06 and FIG. 8). The RPC will determine the start time to ensure that the requested media is available at the desire viewing date and time. The Request Processing Center can schedule downloading/broadcasting of requested media title can in a variety of ways, media can be scheduled for viewing by a specific hour, a specific period of the day (morning, afternoon, evening, or night), or just a date. In FIG. 6, several consumers are requesting the same media title, from a RPC. That request is being forwarded to several MSs. The Media Suppliers respond by generating a providing information to the RPC about what channels are a currently not in use (available for downloading/broadcasting) media file(s). The RPC will use this information to create a Flash Schedule for both the MSs and its own internal use. The files will tell each MSs what files it should broadcast/download, when to download and what channels it should use. This information will be used by the RPC to generate instruction code for control the behavior of the consumers DMR. The instructions will tell it when to start recording, what channel to record from, and any file assembly/security instructions that may be needed.

In FIG. 7A Step 1 Over a communication network a consumer communicates information about desired media (video) download to a Request Processing Center (RPC). The consumer can use a variety of methods to communicate with the RPC, such as telephones, cellular devices, computer terminal, and set on top boxes. The communication device will transmit the consumers request which will contain the identified media that is being requested, identity of the consumer, when the media is requested for viewing (want to have available by date and time), and identity of the device that is to record the requested media.

In FIG. 7B Step 2 The Request Processing Center (RPC) will process the incoming request for all media downloads placed by consumers. All requests from consumers will be grouped according to title of requested media, date and time wanted for viewing, and possible other factors (on going ads campaign or current events).

Step 3 The RPC will forward the processed media request data to the Media Suppliers via a communication network.

Step 4 The Media Supplier(s) will respond to the process data from the RPC with a schedule of what they can download given their current media library content and prior broadcasting and media downloading commitment. This schedule if forwarded to the RPC via a communication network.

In FIG. 7C a Flash Schedule is created that will be used to determine how a requested program will be download on to the network for consumption by a consumer. The Flash Schedule will contain the Start time, End time, and channel over which the download/broadcast will occur. The Flash Schedule will be used by the RPC to generate code that will be forwarded to the requesting consumers of a specific title of media. The code will be used by a DMR indicated by the consumer to capture and/or record the media that is downloaded (broadcasted) by the Media Supplier (s).

In FIG. 7D Step 5 The RPC will use Flash Schedule to tell the Media Suppliers what role they will play in the downloading of a requested media: files to be downloaded, start time and stop time for the downloading process, and the channel on which the download will occur. The RPC will also use the Flash Schedule to forward instructions to the consumer's indicated DMR, instructing the device on how to capture the requested media (video).

In FIG. 7E Step 6 The MS will download their files, and the customer's DMR will capture the video files.

In FIG. 8 Step 1 Over a communication network a consumer communicates information about desired media (video) download to a Request Processing Center (RPC).

Step 2 RPC will process the incoming request for all media downloads placed by consumers. The process media requests will be forwarded to one or more Media Suppliers (MS) that the RPC works with.

Step 3 The MS will create a schedule of what they can download given their current content and commitment.

Step 4 The MS will forward their schedule to the RPC, and the RCP will use the schedule to generate codes that will control the behavior of the customers DMR.

Step 5 The RPC will create a Flash Schedule, telling the MS which assets they are to use (files to be downloaded, time for the downloading to start and stop, and the channel on which the download will occur). The MS will forward the instructions to the customers DMR, instructing the device on how to capture the requested video (media). Step 6 The MS will download their files, and the customer's DMR will capture the video files.

In another embodiment the components of a media file can be distributed to several Remote Catalog Download Centers (RCDC). A RCDC is place where components of a media (video) file are stored, and download/broadcasted when instructed to do so by a Request Processing Center (RPC). When a requested video is to be forwarded to consumers, it is sent from several locations. One of the locations that supply one of the component files will be a video tracking and usage center. A center for tracking video downloads and fee/revenue generated. Because the center must supply one of the components, this will make revenue tracking extremely accurate and allow for the development of Media Suppliers external to the media owner/licenser holder.

AAAAAAAAAAAAAAAAAAAAABBBBBBBBBBB-BBBBBBBBBBBBBBBBBBBBCCCCCCCCCCCDD-DDDDDDDDDD The software in the DMR will assemble the component files into a large file that is in the correct sequence: ABCD. The contents of the assembled file will be viewed by the consumer in the same order as the original video file: [0055] "AAAAAAAAAAAAAAAAAAAA-BBBBBBBBBBBBBBBBBBBBBBBBBBBBBBBCCCC CCCCCCC DDDDDDDDDDDD". In an alternative embodiment, Multiple MS can work together to supply a consumer with a single video. This arrangement will give the MS several advantage such as pooling cost of providing a video, reducing the amount of time required to service a given customer or group of customers, revenue sharing, and possible open new markets (Lightning Program Scheduling—LPS).

Each complete video title available for downloading to a consumer is stored as a subdivided file. The request center will receive a request and create instructions that will program a media-recording device at a remote location to simultaneously record from more than one distinct channel to capture the subdivided parts of the sought-after media file. The remotely located media-recording device can re-assemble the various segments that the requested file, back into a single large media file.

The ability to simultaneously receive multiple sub-components of a large file, will allow the sender greater flexibility and speed in media transmission process. In addition, the smaller the media files being transmitted the less congestion on the network.

In FIG. 3 we show that the two Media Suppliers can collaborate in the download process. One Media supplier can supply certain subdivided components of a Large (Mega) file and another Media Supplier can supper other part of a program. This can be a simultaneous collaboration, or a staggered collaboration.

In FIG. 9, there is a user (Step 1) contacting a Request Processing Center (RPC) within a Media Supplier (MS) facility (Step 3) via a communication network (Step 2). The RPC will accept inputted instructions transmitted over a communication network from the user. The RPC will process and store the data then it will forward the title of the requested title to a MS (FIG. 4, Step 4). The MS will respond with information on how it can supply the requested media. The response will be used to create an internal download/broadcast chart that will be used to create instruction for the capture of the requested title. The RPC will then forward the instructions to consumer's DMR that is situated at a remote location (FIG. 9, step 9), using a communication network. At the Remote location the Digital Media Recorder (DMR) will accept and evaluate the information from the RPC. If a valid authorization code is detected the DMR will accept and process the Instructions from the RPC (MS). DMR can be a sit on top box, a component external and independent, or circuitry inside of an appliance that is capable of displaying the requested media (video, text, et cetera). If the receiver of the instructions is external to the DMR, then the external reception device will be able to transmit the instructions to the DMR microprocessor using Infrared, Radio Frequency, Blue Tooth, Ultra Violet, Sound, Wired technology, or a combination of the fore mention technologies (FIG. 4, step 8). Using instructions from the RPC, one or more MS will transmit the requested media as SMF. The above described the preferred embodiments are intended to illustrate the principles of the invention, but not to limit the scope of the invention. Various other embodiments and modifications to these preferred embodiments may be make by those skilled in the art without departing from the scope of the following claims.

DESCRIPTION OF FIGURES

FIGS. 6A & 6B the software in the DMR will assemble the component files into a large file that is in the correct sequence: ABCD. The contents of the assembled file will be viewed by the consumer in the same order as the original video file: "AAAAAAAAAAAAAAAAAAAABBBBB-BBBBBBBBBBBBBBBBBBBBBBBBBBCCCCCCCC-CCC DDDDDDDDDDDD".

FIG. 1

In FIG. 1, showing a Communication Network that shared by customer/consumers and Network Processing Nodes. The Net Processing Nodes (NPS), receives content from a variety of Media Supplier Channels (Sources of media) that is to be made accessible to consumers/customers over the Communication Network (CN). In this example there are six Media Suppliers and they are ID as channels 101 to channel 106. For this example, the total network capacity is set at 60 bytes/second.

FIG. 2

In FIG. 2, each arrow represents a down of data on to a communication network. The downloaded data can be in the form of one large file that takes up the entire bandwidth allotted in the current queue/cycle (FIG. 2b), or it can be sequential download of several (5) small files that together use the available bandwidth allotted in the current cycle (FIG. 2a). Each of the smaller files will utilize a portion of the user allotted bandwidth. If the use has 10 Kbytes bandwidth on the network, then the total bandwidth available to the Media Supplier would by 10 Kbytes for 1 large (Mega) file or 10 Kbytes divided among 5 sub files (2 Kbytes each). If a media supplier is transmitting files on a multi-user network, employing Time Divided Multiplexing (TDM) technology, small files will inherently provide greater stability to the network. Smaller files will be easier to transmit on a multi-user network without the worry of exceeding the bandwidth allotment of the queue; several 2 Kbytes files will easily fit into a 10 Kbytes queue.

FIG. 3

In FIG. 3 a large file (File Mega) is subdivided into several small files and is transmitted over a network. The component files are transmitted in the traditional sequential methodology on a network that uses TDM methodology. A multi-channel Medial Supplier will be able to sequentially transmit the subdivided file on one channel (Station 102, channel 1 or Station 102, channel 4).

FIG. 4

In FIG. 4, the Media Suppler (MS) will have a media Request Processing Center (RPC) that will process all incoming request for downloading of select media (video) in its catalog (FIG. 4, Step 6). The Media Supplier catalog will be accessible to both the public and registered consumers via a communication network. A communication network is any network over which information or data can be transmitted from one location to another location (examples: telephone, cellular, cable, satellite, or any combination of the above). Each title in the MS catalog will consist of collection of Subdivided Media Files (SMF). The MS will convert one large (2 Gigabyte) media file divided into 100 (twenty-megabyte) smaller media files, making it easier to convey a media tile to consumer(s). The reduced size will also make it easier to and manipulate the media title according to individual consumer viewing profile of a register consumer. The SMF generated from division of a large media file into many smaller media files does not have to be uniform, the generated files can be of varying size. Each of the resulting SMF can be of a different size and require a different amount of time to be transmitted over the communication network (FIG. 5). Each of the SMF generated from a large media file can be transmitted independently by the MS to consumers over a communications network.

In FIG. 5, a Large Media (Video) file is subdivided into many smaller sub files (SMF) that can more easily be transmitted over a communication network to consumers. Once the SMF reach the consumer' Digital Media Recorder (DMR), the DMR can store and re-assembled SMF back into a simulated large media file. Only now the SMF components are tagged and can be displayed in accordance with the consumer's indicated preference: GP (General Public), AV (Adult/Violent, et cetera). The content of any of the SMF components can be displayed or Skipped. Using the consumers indicated preference, the consumer's DMR will display the media according to their viewing profile.

FIG. 6

In FIG. 6A, a large media file composed of many frames of sequential images and audio are divide into 4 segments labeled "A", "B", "C", and "D". These segments that are to be transmitted from a MS (media supplier) over a communication network as small files (SMF). Prior to transmission a schedule of the transmission sequence is created. The schedule indicates the order in which the segments will be transmitted and over what channel/bandwidth (if more than one channel/bandwidth) will be used. The Flash Schedule is an internal schedule created by the RPC for downloading a specific video. The Flash Schedule is based upon information received from the MS regarding the download/broadcast of a specific media title: available amount of bandwidth, time by which the requested video is expected to be available to consumer, amount of time required to transmit each of the (SMF), and the number to consumers requesting the video. The following element go into creating a flash schedule: if ten consumers want to see the video on Thursday, the earliest request is for viewing the video by 8:00 pm (the other nine want to see it later in the day), the video taken two hours to download, then the flash schedule will have instructions that will tell the DMR device of the requesting ten consumers to start record at 6:00 pm on Thursday. This way all the requesting consumers will have the video available by the time that they requested.

In FIG. 6B, the Media Supplier receives file transmittal instructions for transmitting files. The instructions will tell the MS which files to transmit, what order to transmit, and the time at which to transmit the files. Companion instructions will be forwarded to the various users/customers that want to get a copy of the file (view the file). The companion instructions will be received by the user/customer's Digital Media Recorder (DMR). The instructions will tell the DMR how to locate the transmitted file (file segments). The instructions will tell the DMR how to assemble the Small Media File segments back into a file that is to be viewed/accessed by the user/' customer.

FIG. 7

In FIG. 7A, we have request from user/customers to access a video coming from various devices and locations to a Request Processing Center (RPC). Viewing requests are forwarded to a Request Processing Center (RPC), that will determine how the requested title will be delivered, and from what source library/libraries: Media Supplier. Requests can come from Home DMR, from Mobile device, or from Work place computer. The customer indicates the title of desired file, date and time that they want to view its contents.

In FIG. 7B, requests are processed to determine the best time for sending (broadcasting/transmitting) the file. The Request Processing Center (RPC) will generate coded instructions for transmission and capture of transmitted file. The generated code will be forwarded to both Media Supplier(s) and Users/Customers over a communication network.

In FIG. 7C, the Media Supplier will break down a large media file into several small media files (SMF) and transmit the SMF in a sequence the derived from the Request Processing Center schedule (RPC). Request Processing Center instructions will control which SMF files will be transmitted, the order in which the files will be transmitted, and the time at which the files will be transmitted. This information will constitute a RPC generated Flash Schedule for the file. FIG. 7C, also illustrates that more than MS can participate in the transmission of a file to users/customers.

In FIG. 7D, the instructions for viewing/recording a file transmitted by the Media Supplier (MS) are transmitted on a communication network that can be common to both the users/customers and the Request Processing Center (RPC).

In FIG. 7E, the Media Supplier (MS) transmitted small media files (SMF) are captured and stored on a DMR. The DMR will re-assemble the smaller media files back into a large media file in accordance with the RPC instructions.

FIG. 8

In FIG. 8, all of the major components are illustrated with three different users requesting to view the same media file. The user/customer request is forwarded to a remote processing center (RPC). The RPC will analyze the request to determine the requested media file and the date and time at which the requesters (users/customers) want to view it. The RPC will process the request and create instructions codes for the requesters DIVER and the Media Supplier.

Step 1—users/customers entering a request to see the same media file being forwarded to a Request Processing Center (RPC).

Step 2—the RPC process the incoming request to determine when the file should be made available to, by determining when is the earliest time requested for viewing by the three requesters.

Step 3—the RPC communicated with Media Suppliers via a communication network, to determine which one have the file (the file divided into components: SMF). Using information on location of file and requesting information file RPC also generate and forward a Flash Schedule to both the Media Supplier and the media requesters (users/customers).

Step 4—the Media Suppliers receive Flash Schedule for requested file.

Step 5—the Media Suppliers broadcast/transmit the requested media file(s) over the communication network.

Step 6—the users/customers DMR will have instructions for how to capture, save and display the Media supplier transmitted file or files (SMF) from the communication network.

FIG. 9

Figure 1:
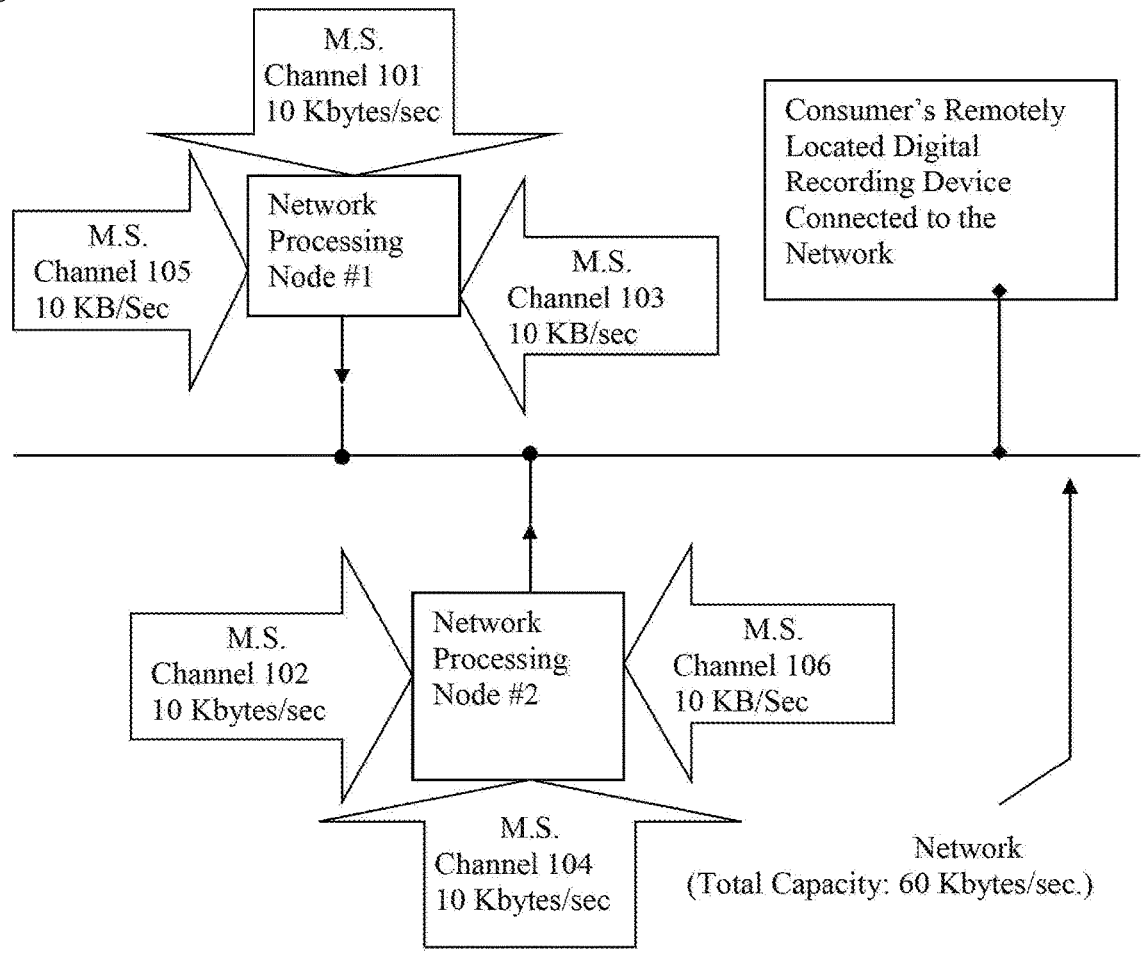
FIG. 1 A fair queuing network will divide the capacity of the network fairly among the user of the network. If a six-user network has a capacity to transmit 60 Kilobyte per seconds, each user (Media Supplier) will have 10 Kilobyte per second transmitting capacity.
Figure 2:
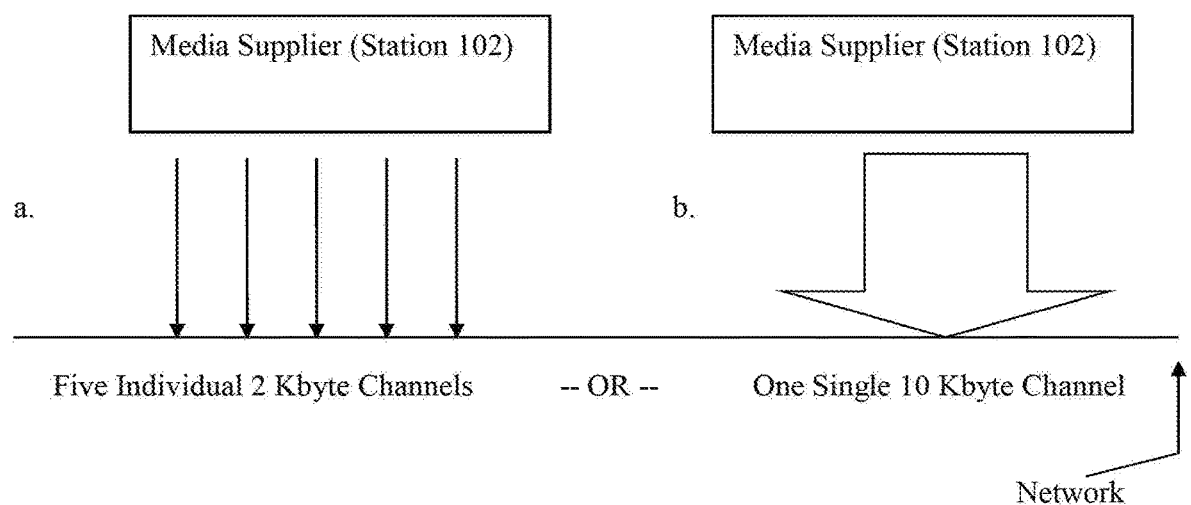
FIG. 2 Each arrow represents a down of data on to a network. The data can be one large file that takes up the entire bandwidth allotted in the current queue/cycle (FIG. 2b), or it can be sequential download of several (5) small files that together use the available bandwidth allotted in the current cycle (FIG. 2a).
Figure 3:
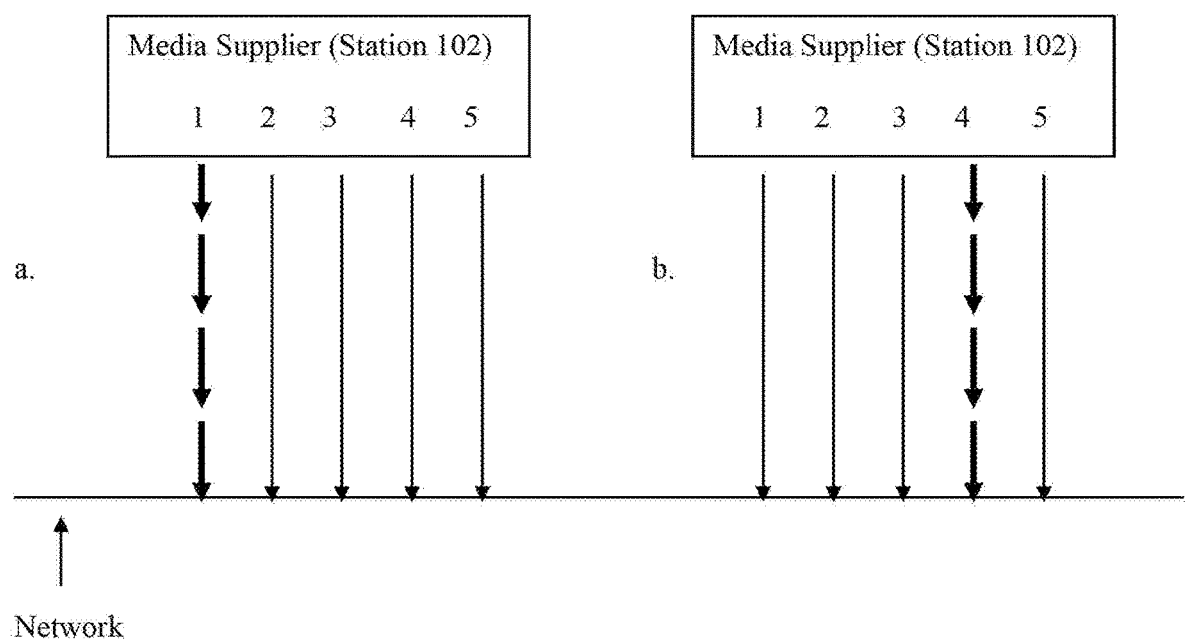
FIG. 3 A large file (File Mega) is subdivided into several small files and is transmitted over a network. The component files are transmitted in the traditional sequential methodology on a network that uses TDM methodology. A multi-channel Medial Supplier will be able to sequentially transmit the subdivided file on one channel (Station 102, channel 1 or Station 102, channel 4).
Figure 4:
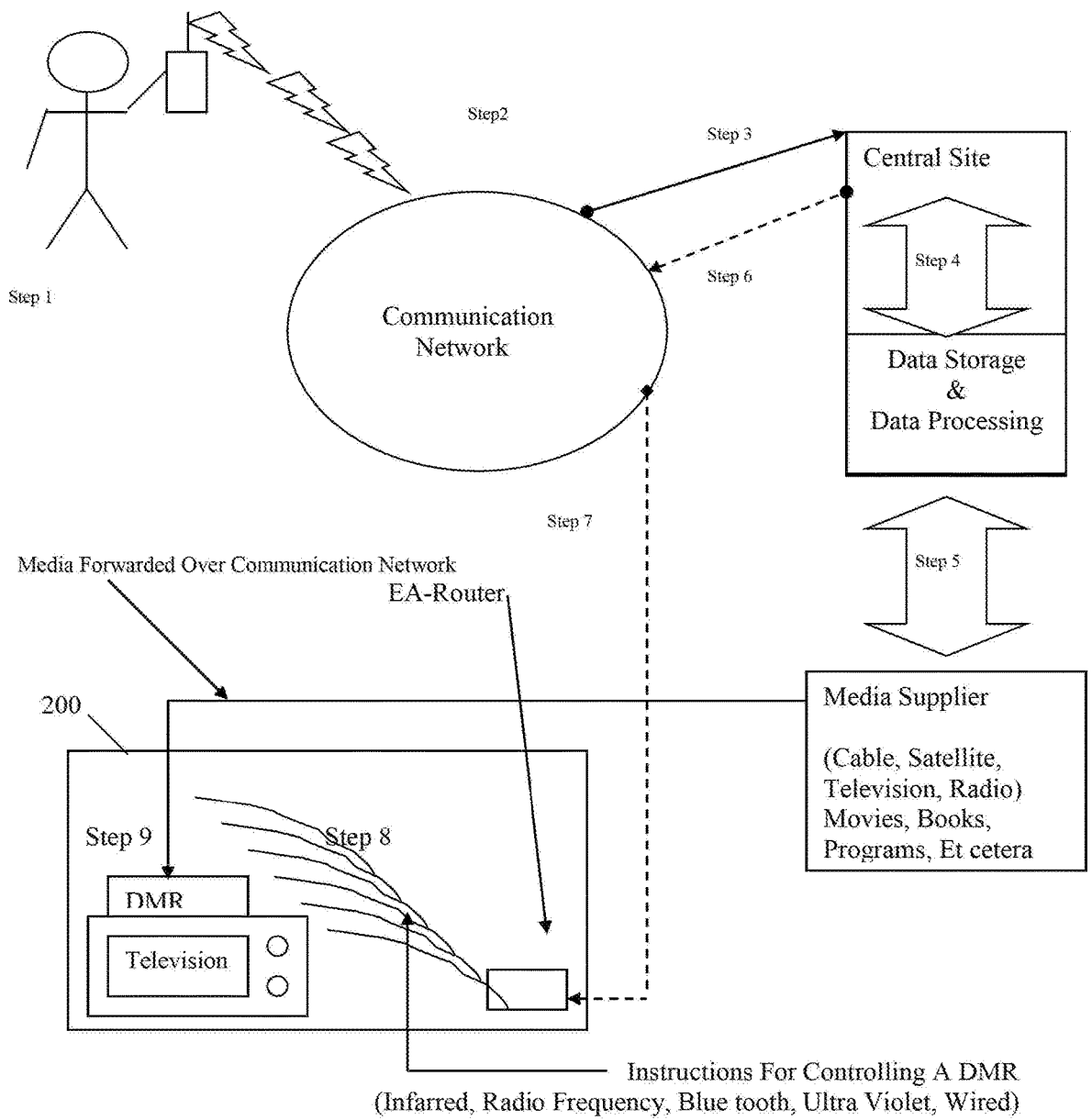
FIG. 4 The Media Suppler (MS) will have a media Request Processing Center (RPC) that will process all incoming request for downloading of select media (video) in its catalog (FIG. 4, Step 6). The Media Supplier catalog will be accessible to both the public and registered consumers via a communication network FIG. 5 A Large Media (Video) file is subdivided into many smaller sub files (SMF) that can more easily be transmitted over a communication network to consumers. Once the SMF reach the consumer' Digital Media Recorder (DMR), the DMR can store and re-assembled SMF back into a simulated large media file, only now there will be tags that can be read by the consumers DMR that will indicate the viewing palate: General, Restricted, Adult, et cetera). Using the consumers indicated preference, the consumer's DMR will display the media according to their viewing profile.
Figure 5:
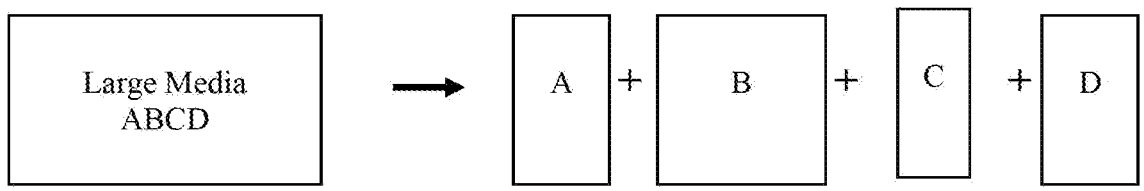
FIG. 5
Figure 7A:
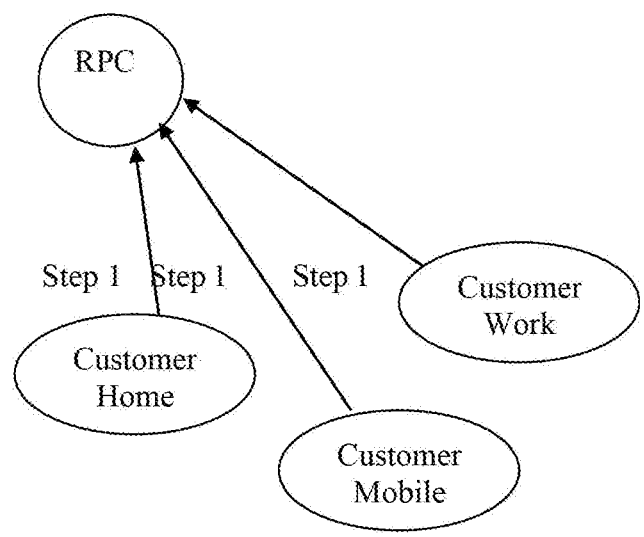
FIG. 7A-7E Over a communication network a consumer communicates information about desired media (video) download to a Request Processing Center (RPC).
Figure 7B:
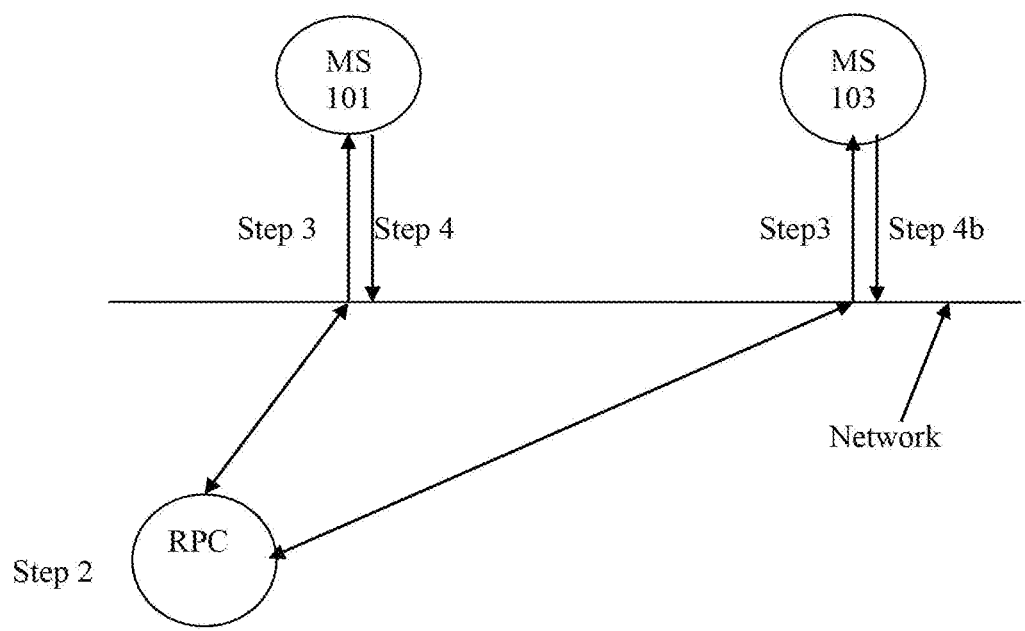
Figure 7C:
Figure 7D:
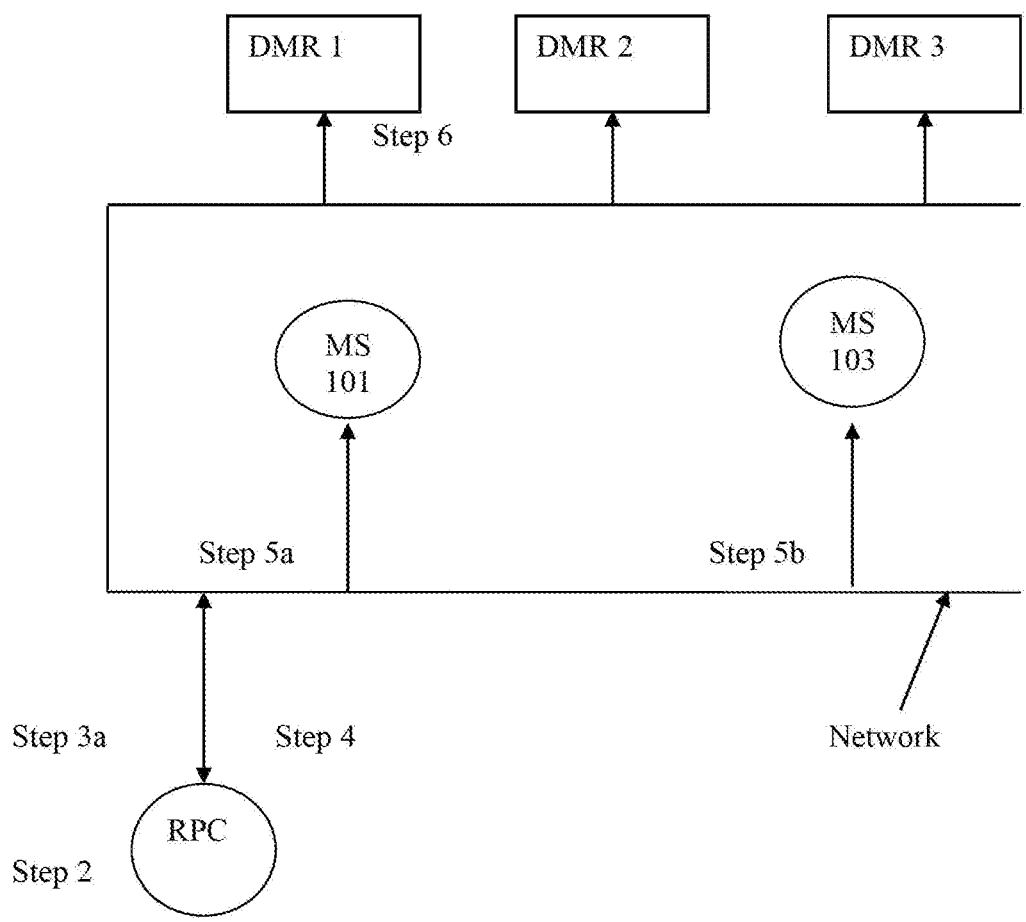
Figure 7E:
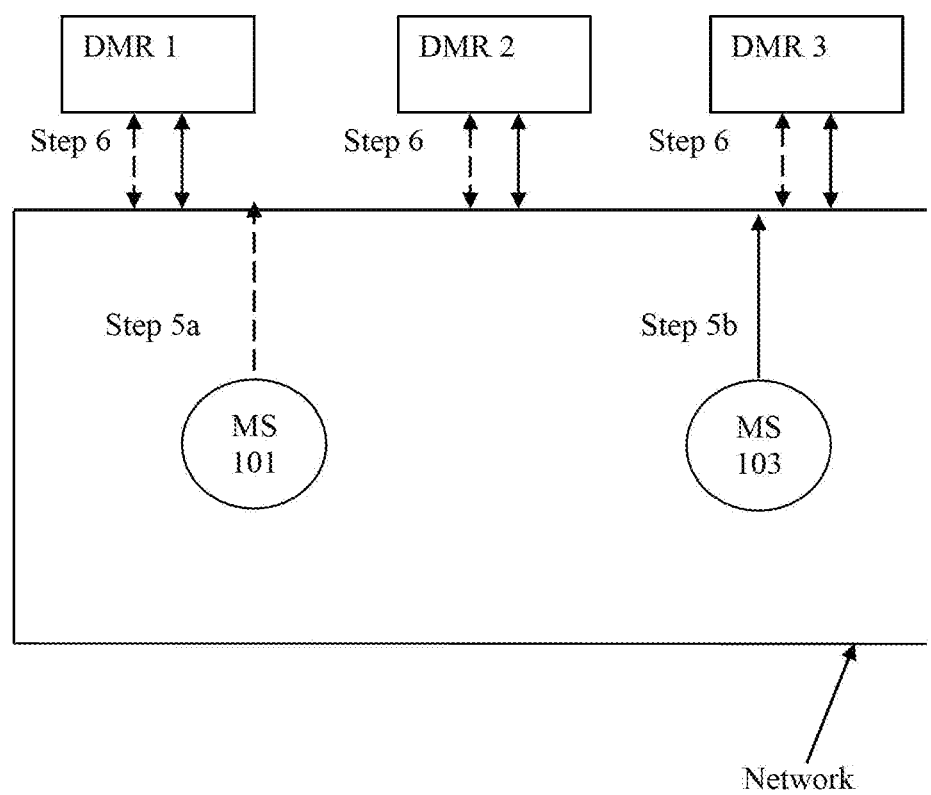
Figure 8:
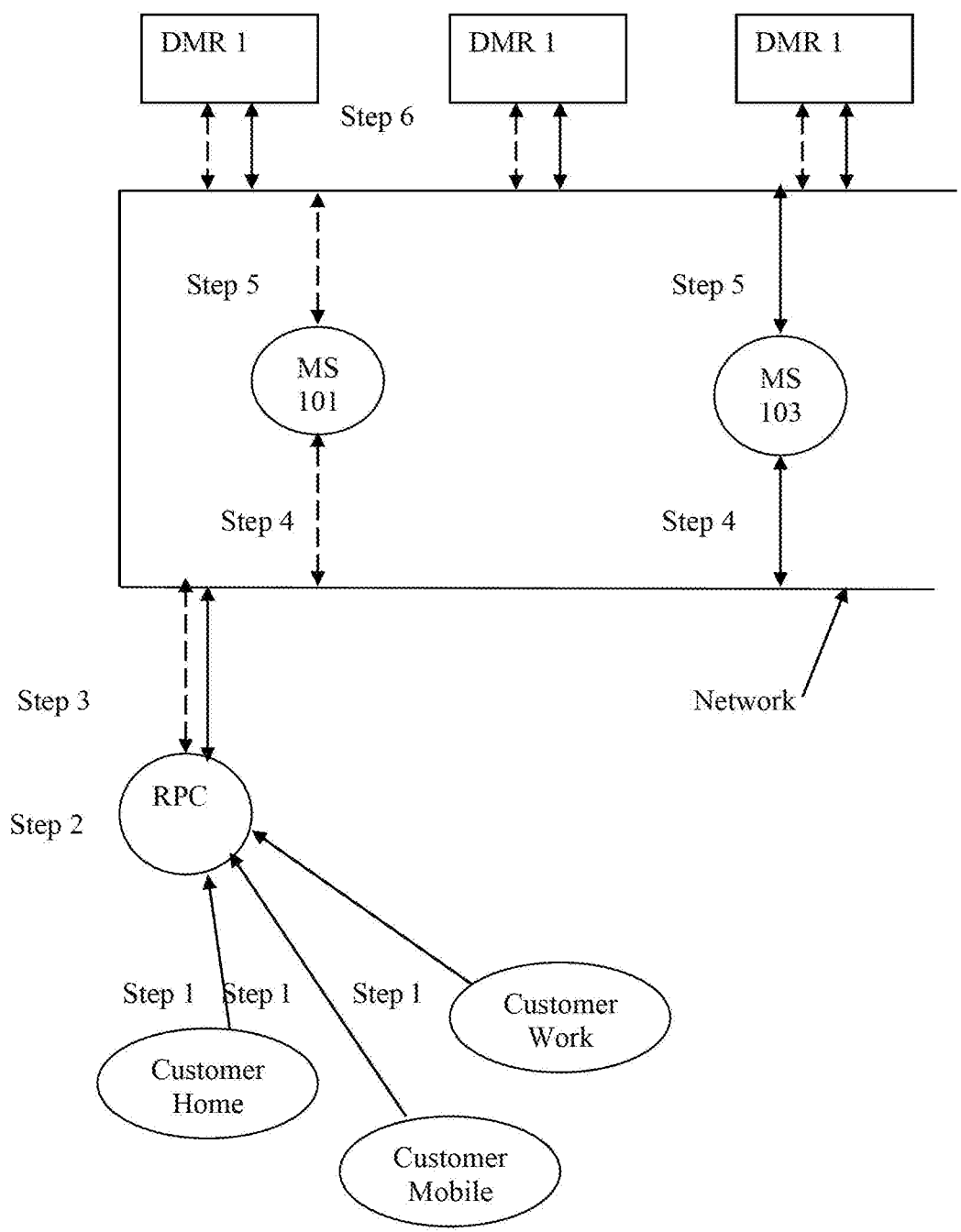
FIG. 8 Over a communication network a consumer communicates information about desired media (video) download to a Request Processing Center (RPC).
Figure 9:
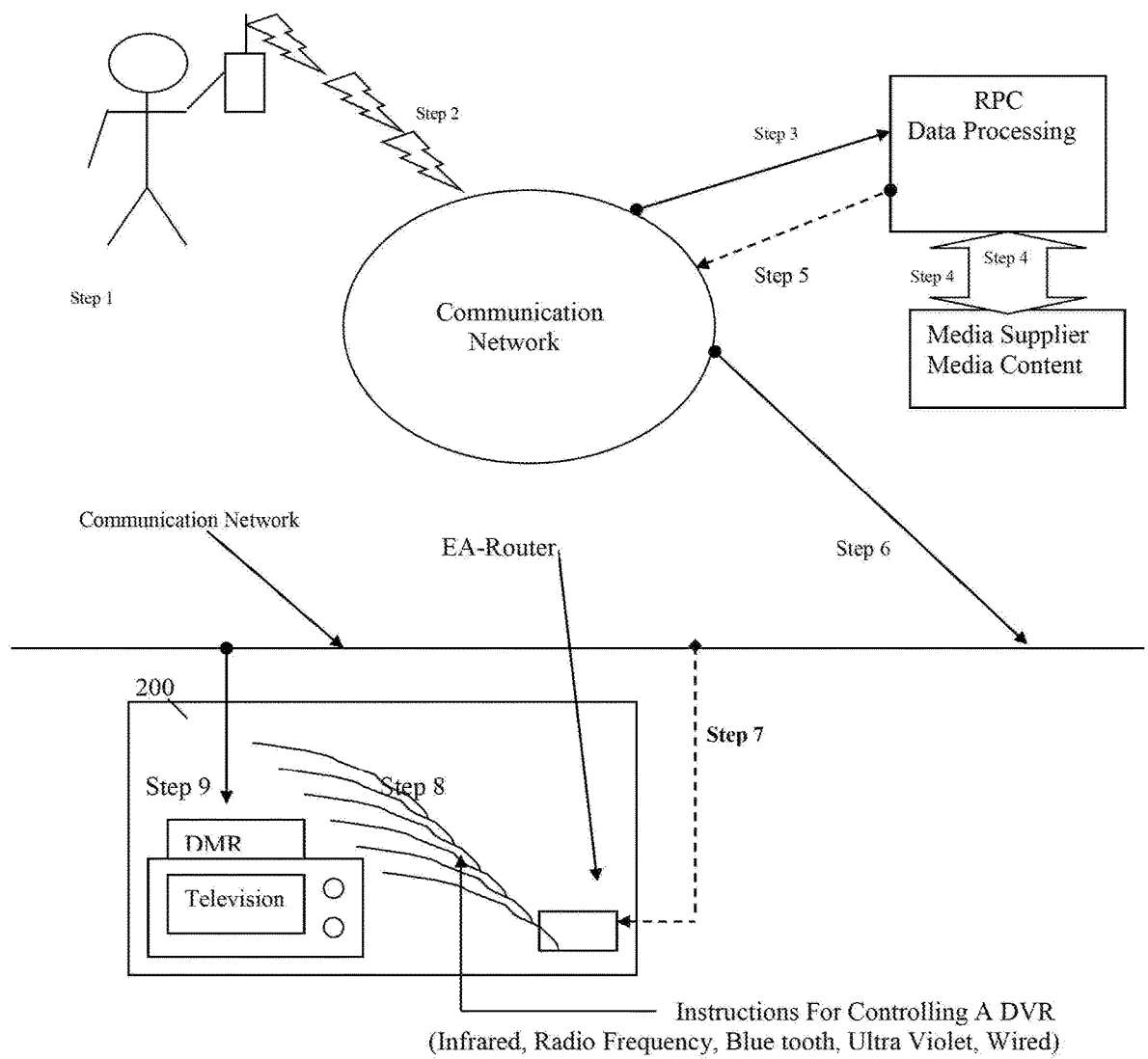
FIG. 9 There is a user (Step 1) contacting a Request Processing Center (RPC) within a Media Supplier (MS) facility (Step 3) via a communication network (Step 2). The RPC will accept inputted instructions transmitted over a communication network from the user.

In FIG. 9, there is a user (Step 1) contacting a Request Processing Center (RPC) within a Media Supplier (MS) facility (Step 3) via a communication network (Step 2). The. RPC will accept inputted instructions transmitted over a communication network from the user. The RPC will process and store the data then it will forward the title of the requested title to a MS (FIG. 4, Step 4). The MS will respond with information on how it can supply the requested media. The response will be used to create an internal download/broadcast chart that will be used to create instruction for the capture of the requested title. The RPC will then forward the instructions to consumer's DMR that is situated at a remote location (FIG. 9, step 9), using a communication network. At the Remote location the Digital Media Recorder (DMR) will accept and evaluate the information from the RPC. If a valid authorization code is detected the DMR will accept and process the Instructions from the RPC (MS). DMR can be a sit on top box, a component external and independent, or circuitry inside of an appliance that is capable of displaying the requested media (video, text, et cetera). If the receiver of the instructions is external to the DMR, then the external reception device will be able to transmit the instructions to the DMR microprocessor using Infrared, Radio Frequency, Blue Tooth, Ultra Violet, Sound, Wired technology, or a combination of the fore mention technologies (FIG. 4, step 8). Using instructions from the RPC, one or more MS will transmit the requested media as SMF.

While the disclosure in this patent are specific they are examples of the preferred embodiments, those skilled in the art will appreciate that there are numerous variations and permutations of the above described systems and techniques that fall within the spirit and scope as set in the appended claims.

What is claimed:

1. Non-transitory computer-readable medium having stored thereon computer-executable code for controlling at least one remote targeted device via a communication network, the code comprising:

(a) code for enabling a remotely located computer at a processing center to monitor the communication network for network activity;

(b) code for enabling said computer to determine whether incoming data from a variety of input terminals contain inputted instructions for controlling a device situated at a location remote to the computer at the processing center, said inputted instructions identifying a specific activity depicted in a media file;

(c) code for enabling the computer at the processing center to accept, process, and store the inputted instructions, and to generate code for instructing the targeted device; and (d) code for the computer to determine when to transmit to the targeted device the code for instructing the targeted device;

wherein said code for instructing the targeted device controls the future behavior of said targeted device by enabling said targeted device to modify the display of a downloaded or streaming media file by skipping a selected section of frames of the media file during said display, said skipped selections being selected on the basis of the depiction of the specific activity identified in said inputted instructions.

2. The non-transitory computer-readable medium of claim 1, wherein the communication network is a global communication network.

3. The non-transitory computer-readable medium of claim 1, wherein the incoming data comprises a user name associated with the targeted device, the location of the targeted device, and a valid user id for accessing the targeted device remotely.

4. The non-transitory computer-readable medium of claim 1, wherein the targeted device comprises a microprocessor able to receive the code for instructing the targeted device.

5. A method for transmitting instructions to control the future behavior of a targeted device at location remote to a centrally located computer, the method comprising:

(a) in the centrally located computer, accepting and processing incoming instructions for a remote targeted device, received from any one of a plurality of remote information input terminals capable of establishing a temporary connection to the centrally located computer, said incoming instructions identifying a specific activity depicted in a media file;

(b) in the centrally located computer, storing for future use the processed instructions for the targeted device; and (c) in the centrally located computer, transmitting the processed instructions to the targeted device;

wherein the processed instructions affect the future behavior of the targeted device in accordance with the instructions entered at the remote information input terminal, by enabling said targeted device to modify the display of a downloaded or streaming media file by skipping a selected section of frames of the media file during said display, said skipped selections being selected on the basis of the depiction of the specific activity identified in said incoming instructions.

6. The method according to claim 5 wherein the incoming instructions comprise a valid user ID, and a targeted device ID.

7. The method according to claim 5, wherein the remote information input terminal communicates over a global communication network.

8. The method according to claim 5, wherein a receiver for the processed instructions is incorporated into the targeted device.

9. The method according to claim 5, wherein the transmitted processed instructions are received by a receiver external to the targeted device.

10. The method according to claim 9, wherein the receiver of the transmitted processed instructions relays said instructions to the targeted device by radio frequency communication.

11. The method according to claim 9, wherein the receiver of the transmitted processed instructions relays said instructions to the targeted device by infrared technology.

* * * * *